US010903776B2

(12) United States Patent
Cairoli et al.

(10) Patent No.: US 10,903,776 B2
(45) Date of Patent: Jan. 26, 2021

(54) INDUSTRIAL ELECTRICAL MACHINE

(71) Applicant: ABB Schweiz AG, Baden (CH)

(72) Inventors: Pietro Cairoli, Cary, NC (US);
Lorenzo Mazza, Cary, NC (US);
Zhiguo Pan, Cary, NC (US)

(73) Assignee: ABB Schweiz AG, Baden (CH)

( * ) Notice: Subject to any disclaimer, the term of this patent is extended or adjusted under 35 U.S.C. 154(b) by 487 days.

(21) Appl. No.: 15/610,402

(22) Filed: May 31, 2017

(65) Prior Publication Data

US 2018/0351438 A1 Dec. 6, 2018

(51) Int. Cl.
| | |
|---|---|
| *H02P 29/02* | (2016.01) |
| *H02K 5/22* | (2006.01) |
| *H02P 29/032* | (2016.01) |
| *H02P 29/024* | (2016.01) |
| *H02P 29/60* | (2016.01) |
| *H02P 29/68* | (2016.01) |

(52) U.S. Cl.
CPC ............ *H02P 29/02* (2013.01); *H02K 5/225* (2013.01); *H02P 29/0241* (2016.02); *H02P 29/032* (2016.02); *H02P 29/60* (2016.02); *H02P 29/68* (2016.02)

(58) Field of Classification Search
CPC ............................ H02P 29/02; H02P 29/032
USPC ........................................ 318/641, 638, 560
See application file for complete search history.

(56) References Cited

U.S. PATENT DOCUMENTS

| | | | |
|---|---|---|---|
| 5,006,744 A | 4/1991 | Archer et al. | |
| 5,159,218 A | 10/1992 | Murry et al. | |
| 5,276,485 A | 1/1994 | Kim | |
| 6,646,397 B1 | 11/2003 | Discenzo | |
| 6,700,400 B2 * | 3/2004 | Atarashi | ............... B60L 50/51 318/400.01 |
| 6,930,417 B2 | 8/2005 | Kaneko et al. | |
| 7,256,522 B2 | 8/2007 | Johnson et al. | |
| 7,581,307 B2 | 9/2009 | Stewart et al. | |

(Continued)

FOREIGN PATENT DOCUMENTS

DE 102004036281 A1 11/2005

OTHER PUBLICATIONS

International Search Report and Written Opinion issued in corresponding international application No. PCT/US2018/035415, dated Oct. 26, 2018, 18 pp.

(Continued)

*Primary Examiner* — David Luo
(74) *Attorney, Agent, or Firm* — Taft Steitinius & Hollister LLP; J. Brace Schelkopf (57) ABSTRACT

An industrial electrical machine includes a stator; a rotor in magnetic communication with the stator; a plurality of windings disposed in the rotor and/or the stator; and an embedded solid state controller. The solid state controller is operative to control the operation of the industrial electrical machine. The solid state controller includes a power semiconductor switching device coupled to the plurality of windings, and includes a communication interface. The power semiconductor switching device is operative to provide switching during operation of the industrial electrical machine, and is operative to turn the electrical machine on and to turn the electrical machine off in response to a control input received by the communication interface.

19 Claims, 4 Drawing Sheets

(56) References Cited

U.S. PATENT DOCUMENTS

| | | | |
|---|---|---|---|
| 8,013,565 B2 * | 9/2011 | Miura | G01K 7/42 |
| | | | 318/473 |
| 8,324,769 B2 | 12/2012 | Clendenen | |
| 8,339,004 B2 | 12/2012 | Tang et al. | |
| 8,946,954 B2 | 2/2015 | Peterson et al. | |
| 8,967,857 B2 * | 3/2015 | Senoo | G01K 13/00 |
| | | | 322/51 |
| 10,128,779 B2 * | 11/2018 | Edwards | H02P 1/00 |
| 2003/0169155 A1 | 9/2003 | Mollenkopf et al. | |
| 2004/0012353 A1 | 1/2004 | Seima et al. | |
| 2013/0214651 A1 | 8/2013 | Kreidler et al. | |
| 2013/0320786 A1 | 12/2013 | Isoda et al. | |
| 2014/0210321 A1 | 7/2014 | Dixon et al. | |
| 2014/0320092 A1 | 10/2014 | Radan | |
| 2015/0048708 A1 | 2/2015 | Nord et al. | |
| 2015/0347114 A1 | 12/2015 | Yoon | |
| 2017/0047869 A1 | 2/2017 | Edwards et al. | |

OTHER PUBLICATIONS

The International Bureau of WIPO, International Preliminary Report on Patentability issued in corresponding Application No. PCT/US2018/035415, dated Dec. 12, 2019, 16 pp.

\* cited by examiner

INDUSTRIAL ELECTRICAL MACHINE

TECHNICAL FIELD

The present application generally relates to electrical machines, and more particularly, but not exclusively, to industrial electrical machines.

BACKGROUND

Electrical machines of various types remain an area of interest. Some existing systems have various shortcomings, drawbacks and disadvantages relative to certain applications. For example, in some industrial electrical machines, simplicity of installation may be improved. Accordingly, there remains a need for further contributions in this area of technology.

SUMMARY

One embodiment of the present invention is a unique industrial electrical machine. Another embodiment is another unique industrial electrical machine. Other embodiments include apparatuses, systems, devices, hardware, methods, and combinations for electrical machines. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
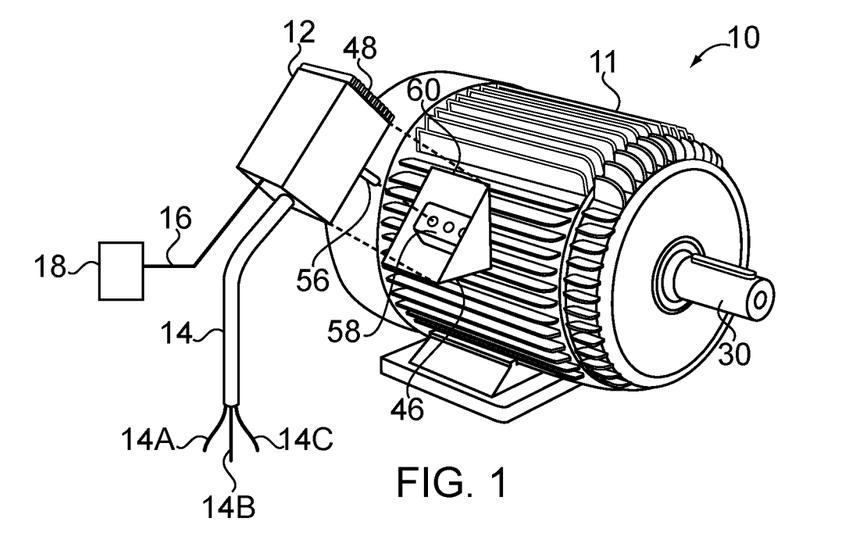
FIG. 1 schematically illustrates some aspects of a non-limiting example of an of an industrial electrical machine in accordance with an embodiment of the present invention.

Referring to FIG. 1, some aspects of a non-limiting example of an electrical machine 10 in accordance with an embodiment of the present invention are schematically illustrated. In one form, electrical machine 10 is an industrial Direct-On-Line (DOL) induction motor. In other embodiments, electrical machine 10 may take other forms, e.g., a switched reluctance, synchronous reluctance, or permanent magnet assisted reluctance motor, a permanent magnet motor, or any other type of motor. In one form, electrical machine 10 is a 3-phase machine. In other embodiments, electrical machine 10 may be a single-phase machine or another multi-phase machine. In one form, electrical machine 10 is an industrial electrical machine, e.g., an industrial motor system. In other embodiments, electrical machine 10 may not be an industrial electrical machine. An industrial electrical machine is an electrical machine that is fixed in place, not handheld, and is used in industry for one or more of various industrial or other non-consumer oriented purposes, e.g., in industrial processes, in the fabrication of industrial or consumer chemicals, materials and goods, the provision of consumer and industrial services, manufacturing or other industrial facilities, municipalities, material handling and other industry, and is not an electrical machine used in consumer products, such as tools used around the home and in home workshops or home-like workshops, such as handheld or fixed electric drills, electric screwdrivers, electric saws and the like used in such workshops, home appliances, automobile accessory electrical machines, e.g., window motors, cabin heater or air conditioning fan motors or the like. Industrial electrical machines may operate in harsher environments, e.g., chemicals, solvents, contamination, etc., that consumer electrical machines are not subject to. An industrial electrical machine as that term is used herein includes electrical machines with power ratings from about 1 horsepower to about 30 hp in some embodiments, and in excess of 30 hp in other embodiments.

Electrical machine 10 includes a motor 11 with an embedded solid state motor controller 12, referred to herein as solid state controller 12 or controller 12. Controller 12 and its circuits and electronic components are considered embedded because they are incorporated into electrical machine 10, affixed to electrical machine 10, i.e., motor 11, as a part or feature of electrical machine 10. In one form, solid state controller 12 is removable from electrical machine 10. Solid state controller 12 is operative to control the operation of electrical machine 10/motor 11. Solid state controller 12 is constructed to form a motor starter, e.g., a DOL motor starter, and includes power semiconductor switching devices in a power control circuit for performing switching to form a solid state contactor to start and stop electrical machine 10, and performs switching to provide power control for operating electrical machine 10. Solid state controller 12 is constructed to form a circuit breaker; and an electronic fuse. Solid state controller 12 is constructed to form an overload protection relay for electrical machine 10; and is constructed to provide fault protection for electrical machine 10. In some embodiments, solid state controller 12 includes a measurement circuit for measuring electrical machine 10 parameters, e.g., voltage and/or current for each phase, and in some embodiments, temperature measurement, for example, at one or more suitable locations in or on electrical machine 10. Solid state controller 12 is constructed to provide diagnostics for electrical machine 10, e.g., based on the measured parameters, and provides communications for sending communications to electrical machine 10, e.g., commands, and for receiving communications from electrical machine 10 in some embodiments.

Solid state controller 12 includes a power input 14 and a control/communication input 16. Power input 14 may be, for example, a 3-phase power line having wires 14A, 14B and 14C, e.g., one electrical line for each phase. Power input 14 may include a greater or lesser number of electrical lines in other embodiments. Control/communication input 16 is an input in the form of a wired, wireless or optical communication link to permit reception of a control input signal for controlling the operation of electrical machine 10, and in some embodiments to provide or exchange information, such as device status, current monitoring, diagnostic information, health information and other data. Control/communication input 16 is operative to receive control inputs to solid state controller 12 from input device 18. In one form, control/communication input 16 is a wired communication link operative to receive low power signals from an input device 18, e.g., a control voltage input in the range of 0-24V or a control current input in the range of 1-100 mA, e.g., for providing on/off (start/stop) commands to electrical machine 10, providing forward/reverse (direction of rotation) signals and the like.

In some embodiments, control/communication input 16 may be a wired analog or digital link, a wireless analog or digital link, an optical link or an Internet or other network link, wired or wireless or optical. In some embodiments, control/communication input 16 may be subdivided into a control input for supplying control signals, and a communications input for receiving communications at solid state controller 12 via a wired, wireless or optical communication link. In other embodiments, control inputs and communications inputs may share a common control/communication input 16 link. In some embodiments, control/communication input 16 is operative to transmit data and communications from solid state controller 12 to input device 18 or another controller, computer or device, in addition to receiving data and communications from input device 18. Input device 18 is an input or control device, which may be a programmable logic circuit (PLC), a digital signal processor (DSP), a computer, or other controller or device, and may employ any suitable communication protocol, including network communications protocols. Communications protocols/systems used by solid state controller 12, control/communications input 16 and input device 18 may include, for example, Control Area Network (CAN) protocol, Modbus, Ethernet, profibus, fieldbus, SmartWire-DT, the Internet or a local area network, or one or more of various protocols or systems, e.g., CAT5, just to name a few. In some embodiments, control/communication input 16 may be an Internet over power AC bus/power line link, and may be part of or coupled to power input 14. In some embodiments, electrical machine 10 is an Internet of Things component. In other embodiments, communication/control link 16 may be a wireless transmitter and receiver for broadcasting data to input device 18 and receiving control or other input from input device 18.

Solid state controller 12 in some embodiments provides for the direct connection of electrical machine 10 to the grid, i.e., power grid, such as a utility or local power grid, via power input 14, and is directly controllable with a control signal or through a communication line, e.g., via input device 18 and control/communication input 16. Because electrical machine 10 is directly connected to the grid and a control/communication channel, by way of embedded solid state controller 12, the control electrical panels typically required in order to operate an industrial electrical machine, e.g., a DOL induction motor, are not required. For example, conventional contactors and associated enclosures, e.g., wall-mounted, control power panels, circuit breakers, relays, overload protection relay, and fuse holder are not required, since the functions performed by these devices are performed by solid state controller 12. Electrical machine 10 is thus constructed to be directly connected to the power grid without any intervening contactors, e.g., for turning electrical machine 10 on or off, or circuit breakers, relays, overload relays or fuses. For example, solid state controller 12 is constructed to be, among other things, a motor starter, e.g., a DOL motor starter, including providing switching wherein solid state controller 12 operates as a contactor, a circuit breaker and an overload relay for motor 11 and electrical machine 10. Solid state controller 12 is operative to turn on and off electrical machine 10, provide an electrical machine 10 emergency stop, and in some embodiments, control power output of electrical machine 10 and/or control of electrical machine 10 speed and direction of rotation. In addition, solid state controller 12 provides remote control (e.g., via input device 18 and control communication link 16), monitoring, remote measurement and diagnostics, and feedback. Solid state controller 12 is constructed to provide overload protection, short-circuit protection, power consumption monitoring, diagnostic monitoring, and remote reconfiguration of the controller 12. The control platform of electrical machine 10 can be reconfigured to accept different type of control signals and communication protocols, including wired control signal, internet over power line, wireless broadcast or transmission, to name a few.

Figure 2:
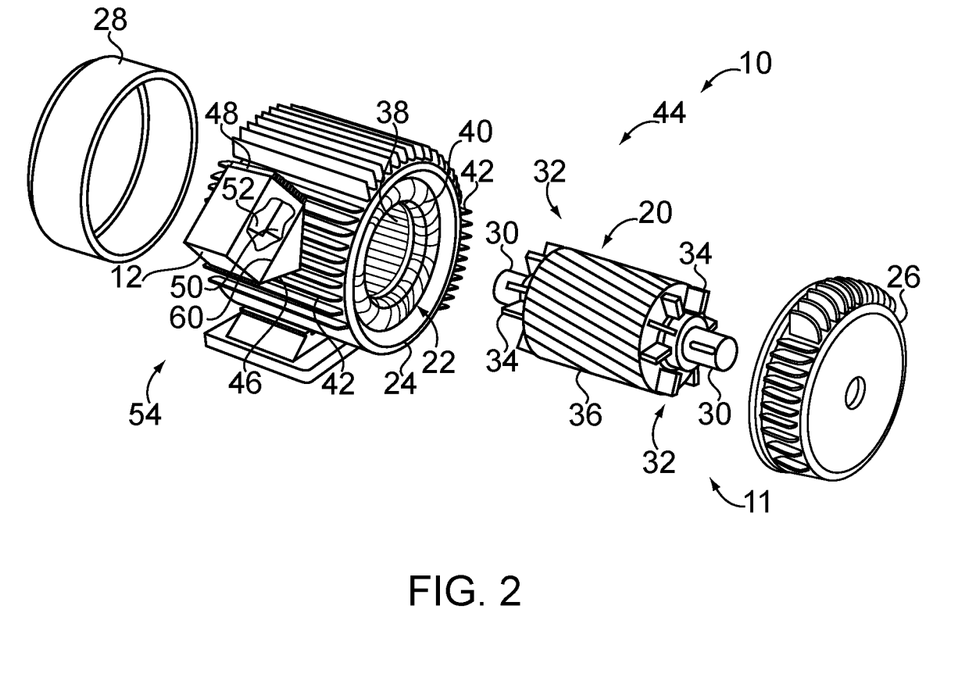
FIG. 2 schematically illustrates some aspects of a non-limiting example of an of an industrial electrical machine in accordance with an embodiment of the present invention.
Figure 3:
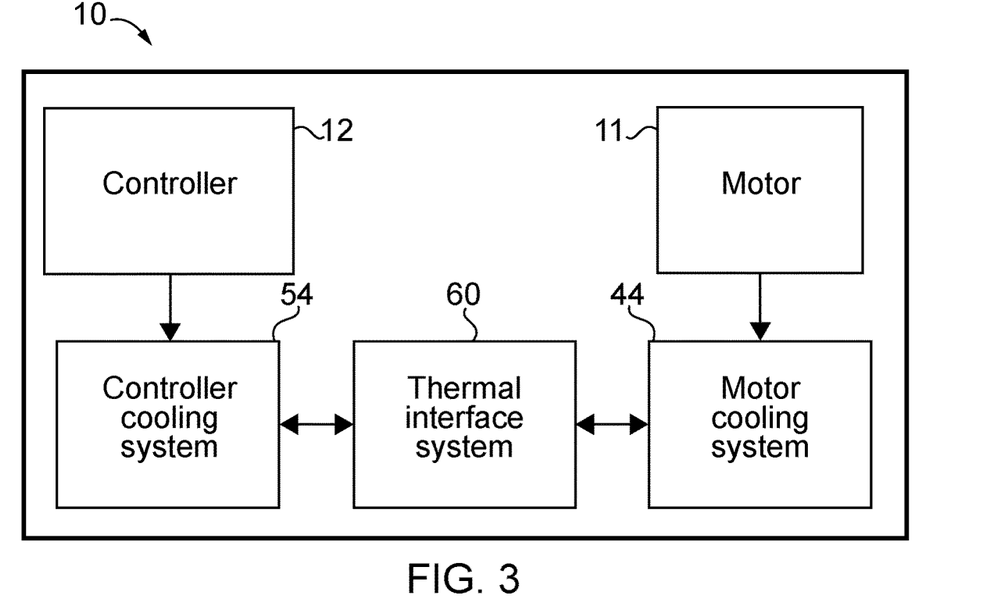
FIG. 3 schematically illustrates some aspects of a non-limiting example of an industrial electrical machine cooling arrangement in accordance with an embodiment of the present invention.

Referring to FIGS. 2 and 3 in conjunction with FIG. 1, electrical machine 10, in particular, motor 11, includes a rotor 20, a stator 22, a frame 24, a forward end bell 26 and an aft end bell 28. Rotor 20 includes a shaft 30 protruding at each end, supported by rotor support bearings (not shown), e.g., mounted in or adjacent to end bells 26 and 28. Located at each end of rotor 20 is a fan 32 having multiple blades 34. Rotor 20 includes rotor electromagnets 36 in magnetic communication with stator 22.

Stator 22 is mounted to and housed by frame 24, and is in thermal communication with frame 24. Frame 24 encloses rotor 20 and stator 22. Stator 22 includes stator electromagnets 38 with a plurality of windings 40 disposed therein. Stator electromagnetics 38 are in magnetic communication with rotor electromagnets 36. Frame 24 includes cooling fins 42. Cooling fins 42 and fans 32 form a cooling system 44 constructed to cool motor 11, e.g., stator 22 and rotor 20. Cooling system 44 may include other cooling components and features not mentioned herein. In the process of cooling motor 11, heat is transferred to frame 24, e.g., from stator 22 and from air used to cool rotor 22; and cooling fins 42 transfer heat from frame 24 to the ambient environment. Frame 24 includes an integral boss or mounting pad 46 for mounting embedded solid state controller 12.

Solid state controller 12 is mounted, and in some embodiments in or partially in pad 46. Solid state controller 12 includes cooling fins 48, a heat sink 50, and in some embodiments a cooling fan 52. Cooling fins 48, heat sink 50 and cooling fan 52 form a cooling system 54 constructed to provide cooling for solid state controller 12. In other embodiments, cooling system 54 may include a greater or lesser number of cooling system components/features. Solid state controller 12 includes electrical plugs 24 (only one of which is shown in FIG. 1) for electrical connection to sockets 26 disposed in pad 46 for delivering power to windings 40 of electrical machine 10.

In one form, cooling system 44 is optimized for cooling motor 11, e.g., including rotor 20 and stator 22; and cooling system 54 is optimized for cooling embedded solid state controller 12. Some embodiments include a thermal interface system 60 constructed to thermally couple cooling system 44 and cooling system 54, e.g., so that cooling system 44 can help share solid state controller 12 thermal loads, and so that cooling system 54 can help share motor 11 thermal loads, e.g., rotor 20 and stator 22 thermal loads and other electrical machine 10 thermal loads, e.g., depending upon the operating condition of electrical machine 10.

In one form, thermal interface system 60 thermally couples cooling system 44 and cooling system 54 to each other by thermally coupling solid state controller 22 to frame 24, e.g., to mounting pad 46 of frame 24. Thermal interface system 60 may be, for example, a thermal paste or a thermal grease, and/or smooth, flat mating surface contact areas on solid state controller 12 and mounting pad 46, which may in some embodiments include surface treatments to reduce or minimize thermal contact resistance. In other embodiments, thermal interface system 60 may include other components or features, e.g., one or more heat pipes or other heat transfer mechanisms or devices to transfer heat from solid state controller 22 to mounting pad 46/frame 24 and/or heat pipes or other heat transfer mechanisms or devices to transfer heat from mounting pad 46/frame 24 to solid state controller 22. In some embodiments, cooling system 44 is constructed to provide cooling for solid state controller 12 in addition to cooling rotor 20 and stator 22. In some embodiments, cooling system 54 is constructed to provide cooling for rotor 20 and stator 22 in addition to solid state controller 12. In some embodiments, electrical machine 10 is optimized to provide cooling to both motor 11 and controller 12.

Figure 4:
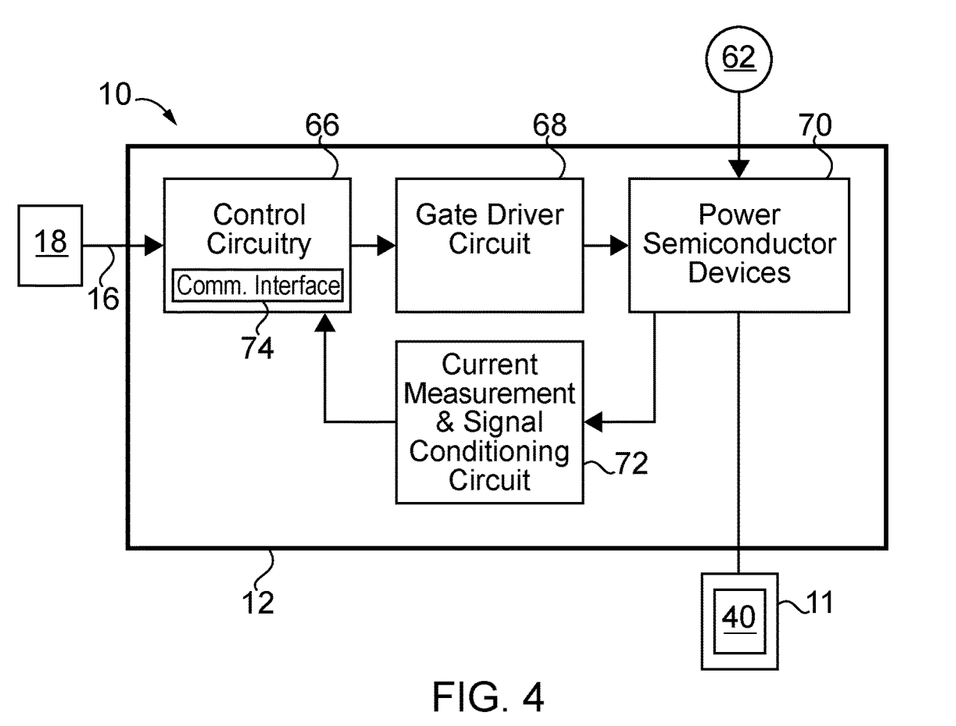
FIG. 4 schematically illustrates some aspects of a non-limiting example of an industrial electrical machine with an embedded solid state controller in accordance with an embodiment of the present invention.

Referring to FIG. 4, some aspects of a non-limiting example of an embedded solid state controller in an electrical machine in accordance with an embodiment of the present invention is schematically illustrated. In the embodiment of FIG. 4, controller 12 (and hence, electrical machine 10) is coupled to a grid 62 such as a utility or local power grid, and is coupled to input device 18 via control/communication input 16. Controller 12 provides power, e.g., 3-phase power to motor 11, in particular, to windings 40 for operating electrical machine 10. In the embodiment of FIG. 4, controller 12 includes control circuitry 66, a gate driver circuit 68, power semiconductor switching devices 70 (also referred to as power semiconductor devices 70) and a current measurement and signal conditioning circuit 72, each of which are embedded as part of controller 12 and electrical machine 10.

In one form, control circuitry 66 is a microcontroller. In other embodiments, control circuitry 66 may be an analog control circuit, another form of a digital control circuit or controller, or any form of control circuitry or controller. Other examples of control circuitry 66 include a field programmable gate array (FPGA), a complex programmable logic device (CPLD), a discrete circuit, e.g., logic circuitry, a programmable logic controller (PLC), to name a few. Control circuitry 66 includes a communication interface 74, which is a control and communication interface that is coupled to input device 18 via control/communication input 16. Communication interface 74 is operative to receive control input and other communication input from input device 18 via control/communication input 16 for controlling the operation of electrical machine 10, as well as to transmit communications to input device 18 from controller 12, i.e., from control circuitry 66. In some embodiments, communication interface 74 has an internet protocol (IP) address, and control/communication input 16 is an Internet link. In some embodiments control/communication input 16 may be an Internet over AC bus/power line communication link, e.g., and may be part of or coupled to power input 14. Control circuit 66 is coupled to gate driver circuit 68. Gate driver circuit 68 is coupled to power semiconductor devices 70. Current measurement and signal conditioning circuit 72 is coupled to power semiconductor devices 72 and to control circuitry 66.

Control circuitry 66 is operative to control the operation of electrical machine 10, e.g., motor 11, based on the output of communication interface 74, for example, to control on/off or start/stop operations, emergency stop operations, and in some embodiments, speed control and/or torque control and/or forward/reverse rotational direction control, by controlling the output of gate driver circuit 68. Gate driver circuit 68 is operative to provide gate drive signals to power semiconductors 70 under the control of control circuitry 66.

Power semiconductor switching devices 70 are disposed in or on frame 24, e.g., in or on pad 46 as part of controller 12. Power semiconductor devices 70 are coupled to windings 40 and operative to control the flow of power to windings 40 by performing switching of the power supplied to electrical machine 11 from grid 62 during operation of electrical machine 10. Power semiconductor devices 70 are also operative to perform switching to start/stop electrical machine 10, i.e., to turn electrical machine 10 and to turn electrical machine 10 off in response to a control input received by communication interface 74 from input device 18 via control/communication input 16. In addition, power semiconductors 70 are operative to perform switching in order to perform an emergency stop of electrical machine 10, as well as to perform torque control, speed control and other desirable motor control functions, e.g., as mentioned herein.

In one form, power semiconductor devices 70 include one or more thyristor-type devices, and one or FET-type devices. In various embodiments, the thyristor type devices may be, for example and without limitation, one or more thyristors and/or SCRs and/or TRIACs. In some embodiments, one or more thyristors may be substituted with bipolar devices. Thyristor-type devices may also be or include one or more integrated gate-commutated thyristors (IGCTs), insulated-Gate Bipolar Transistors (IGBTs), gate turn-off thyristors (GTOs), and MOS-controlled thyristors (MCTs).

The FET-type devices may be, for example and without limitation, SiC Junction gate Field Effect Transistors (JFETs), SiC JFETs in Cascode configuration with Si MOSFETs or GaN MOSFETs, SiC Metal Oxide Semiconductor Field-Effect Transistors (MOSFETs), SiC Junction gate field-effect transistors with an anti parallel diode, SiC Metal Oxide Semiconductor Field-Effect Transistors with an anti parallel diode, a GaN four quadrant FET, a symmetrical normally-ON SiC JFET, or a dual-gate normally-ON GaN HEMT. FET-type devices may also be or include one or more of a GaN High-Electron-Mobility Transistor (HEMT), GaN field-effect transistor (FET), a GaN Enhancement mode HEMT (E-HEMT), a Si Metal Oxide Semiconductor Field-Effect Transistor (MOSFET), a Si Junction gate field-effect transistor (JFET), a Si Super Junction MOSFET and Wide-Band Gap, SiC, GaN, Diamond semiconductor devices. Diodes, e.g., employed in the Cascode configuration, may include, for example and without limitation, one or more of a Pn diode, Schottky diode, an SiC Schottky diode, or one or more other diode types. Diodes may be used in conjunction with other FET-type devices as well, e.g., as freewheeling diodes.

Current measurement and signal conditioning circuit 72 is operative to measure the phase currents at power semiconductor devices 70, and to condition the measured current signal. Current measurement and signal conditioning circuit 72 provides the conditioned measured current signal to control circuitry 66 for use in controlling the operation of gate driver circuit 68 and hence, the operation of power semiconductor devices 70. In some embodiments, current measurement and signal conditioning circuit 72 is also operative to measure current, voltage and/or one or more motor 11 temperatures as part of diagnostic or fault detection or protection, which is performed by control circuitry 66. For example, in some embodiments, control circuitry 66 is operative to perform diagnostic monitoring based on based on the measured current and/or voltage for each phase and/or based on the measured temperature. In some embodiments, control circuitry 66 is operative to perform fault protection for electrical machine 10, e.g., based on the measured current and/or voltage for each phase. In some embodiments, control circuitry 66 is operative to provide overload protection for electrical machine 10, e.g., based on the measured current and/or voltage for each phase.

Figure 5:
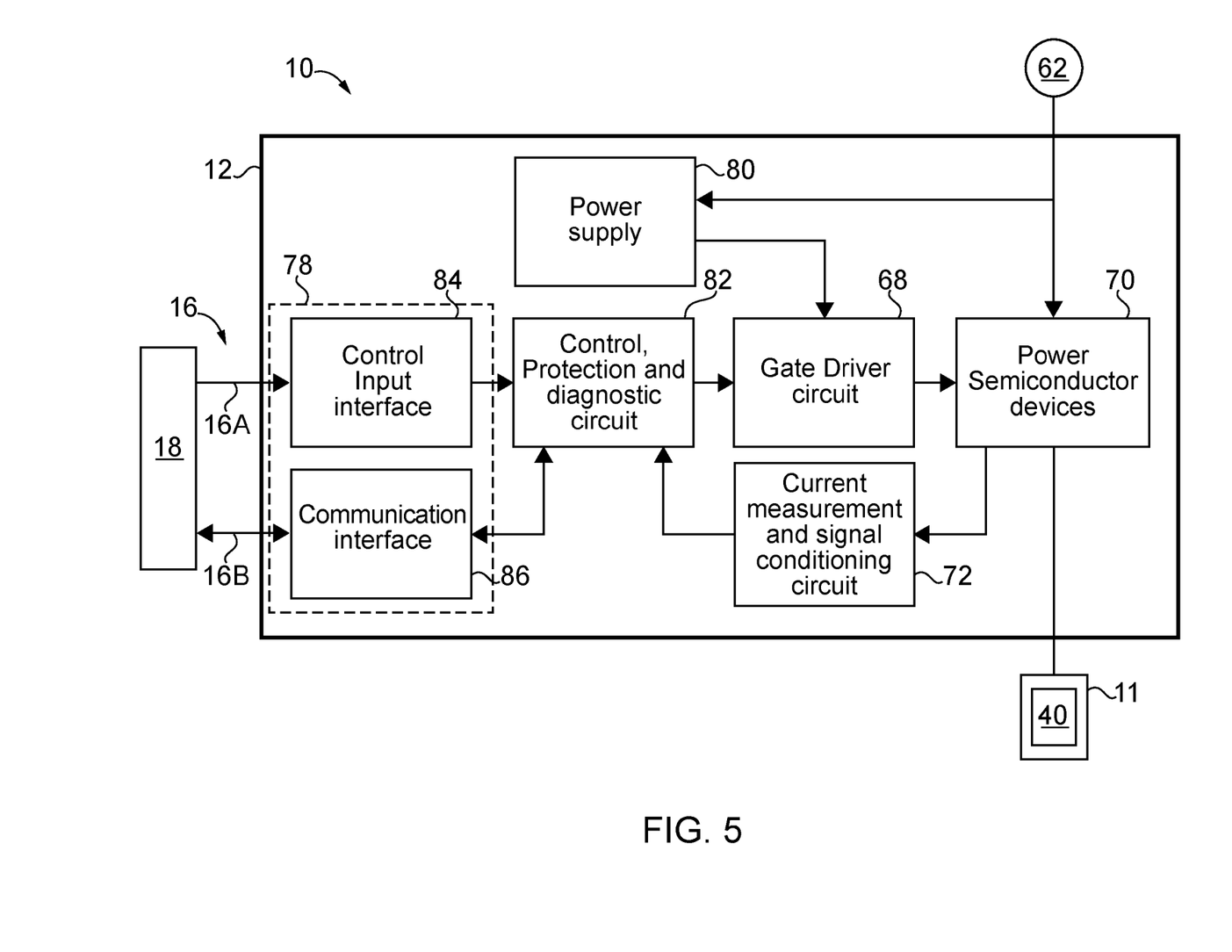
FIG. 5 schematically illustrates some aspects of a non-limiting example of an industrial electrical machine with an embedded solid state controller in accordance with an embodiment of the present invention.

Referring to FIG. 5, some aspects of a non-limiting example of an embedded solid state controller in an electrical machine in accordance with an embodiment of the present invention is schematically illustrated. In the embodiment of FIG. 5, controller 12 (and hence, electrical machine 10) is coupled to grid 62, and is coupled to input device 18 via control/communication input 16. In the embodiment of FIG. 5, control/communication input 16 is subdivided into a control input or link 16A and a communication input or link 16B. Controller 12 provides power, e.g., 3-phase power to motor 11, in particular, to windings 40 for operating electrical machine 10.

In the embodiment of FIG. 5, embedded controller 12 includes a communication interface 78, a power supply 80, a control, protection and diagnostic circuit 82, as well as gate driver circuit 68, power semiconductor devices 70 and current measurement and signal conditioning circuit 72, e.g., as described above with respect to the embodiment of FIG. 4, the foregoing of which are embedded as part of controller 12 and electrical machine 10. Communication interface 78 includes a control input interface 84 and a communication interface 86. Input device 18 is coupled to control input interface 84 via control input or link 16A for providing control inputs to electrical machine 10, e.g., start/stop (on/off) commands, emergency stop commands, and in some embodiments speed and/or torque and/or forward/reverse control commands. In other embodiments, other control inputs may be supplied from input device 18 to control input interface 84 via control input 16A. Control input or link 16A may be wired, wireless or optical, and may use any suitable low voltage or current control signal or any suitable communication protocol or system, e.g., mentioned herein regarding control/communication input 16.

Input device 18 is coupled to communication interface 84 via communication input or link 16B. In some embodiments, communication input or link 16B is bidirectional, e.g., so that communication data can flow in both directions between input device 18 and embedded controller 12, which may be used for exchanging communications between input device 18 and controller 12, e.g., diagnostic data, health or condition monitoring, remote configuration changes to controller 12 control parameters, or other communications, e.g., described elsewhere herein. Communication input or link 16B may be wired, wireless or optical, and may use any suitable communication protocol or system, e.g., mentioned herein regarding control/communication input 16. In some embodiments, communication interface 78 (e.g., control input interface 84 and/or communication interface 86) has an internet protocol (IP) address, and control input or link 16A and/or communication input or link 16B is an Internet link. In some embodiments, control input or link 16A and or communication input or link 16B may be an Internet over AC bus/power line communication link and may be part of or coupled to power input 14.

Control input interface 84 and communication interface 86 are coupled to control, protection and diagnostic circuit 82, and provide inputs into control, protection and diagnostic circuit 82 based on the control and communication inputs received from input device 18. In one form, power supply 80 receives power from grid 62. Power supply 80 is coupled to control, protection and diagnostic circuit 82 and gate driver circuit 68, and converts the power from grid 62 to a suitable voltage and current for provision to and use by control, protection and diagnostic circuit 82 and gate driver circuit 68. Gate driver circuit 68 is coupled to power semiconductor devices 70. Current measurement and signal conditioning circuit 72 is coupled to power semiconductor devices 70 and to control, protection and diagnostic circuit 82.

Control, protection and diagnostic circuit 82 is operative to control the operation of electrical machine 10, e.g., motor 11, for example, to control on/off or start/stop operations, emergency stop operations, and in some embodiments, speed control and/or torque control and/or forward/reverse, by controlling the output of gate driver circuit 68. Gate driver circuit 68 is operative to provide gate drive signals to power semiconductor devices 70 under the direction of control, protection and diagnostic circuit 82. Power semiconductor switching devices 70 are operative to control the flow of power to windings 40 by performing switching, e.g., as described above with respect to the embodiment of FIG. 4, in response to control inputs received via control input 16A.

Current measurement and signal conditioning circuit 72 is operative to measure the phase currents at power semiconductor devices 70, and to condition the measured current signal. Current measurement and signal conditioning circuit 72 provides the conditioned measured current signal to control, protection and diagnostic circuit 82 for use in controlling the operation of gate driver circuit 68 and hence, the operation of power semiconductor devices 70. In some embodiments, current measurement and signal conditioning circuit 72 is also operative to measure current, voltage and/or one or more motor 11 temperatures as part of diagnostic or fault detection or protection, which is performed by control, protection and diagnostic circuit 82. For example, in some embodiments, control, protection and diagnostic circuit 82 is operative to perform diagnostic monitoring based on based on the measured current and/or voltage for each phase and/or based on the measured temperature. In some embodiments, control, protection and diagnostic circuit 82 is operative to perform fault protection for electrical machine 10, e.g., based on the measured current and/or voltage for each phase. In some embodiments, control, protection and diagnostic circuit 82 is operative to provide overload protection for electrical machine 10, e.g., based on the measured current and/or voltage for each phase.

Figure 6:
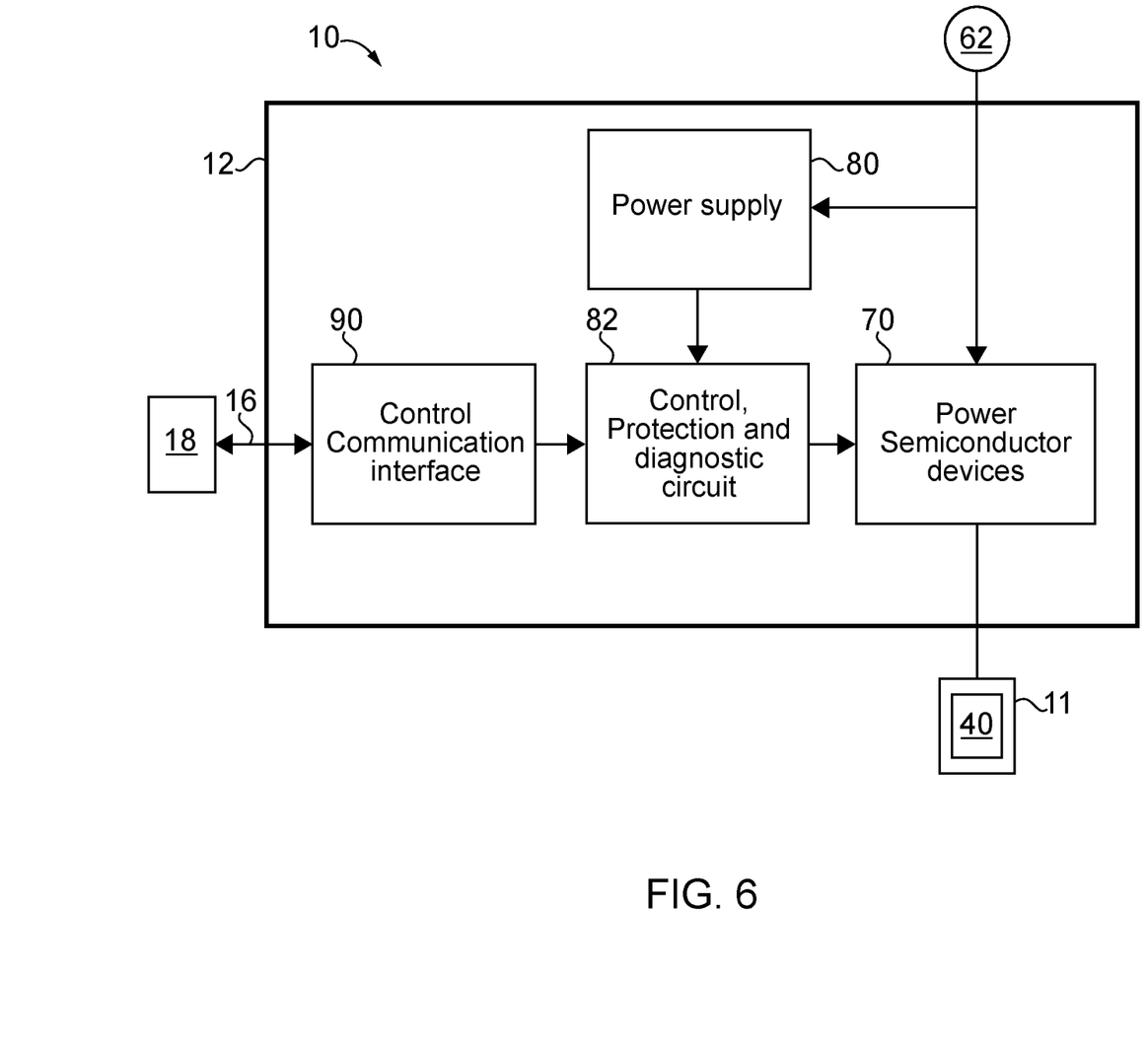
FIG. 6 schematically illustrates some aspects of a non-limiting example of an industrial electrical machine with an embedded solid state controller in accordance with an embodiment of the present invention.

Referring to FIG. 6, some aspects of a non-limiting example of an embedded solid state controller in an electrical machine in accordance with an embodiment of the present invention is schematically illustrated. In the embodiment of FIG. 6, controller 12 (and hence, electrical machine 10) is coupled to grid 62, and is coupled to input device 18 via control/communication input 16. Controller 12 provides power, e.g., 3-phase power to motor 11, in particular, to windings 40 for operating electrical machine 10.

In the embodiment of FIG. 6, embedded controller 12 includes a control/communication interface 90, and a power supply 80, control, protection and diagnostic circuit 82, power semiconductor devices 70, e.g., as described above with respect to the embodiment of FIGS. 4 and 5, the foregoing of which are embedded as part of electrical machine 10. In the embodiment of FIG. 6, control, protection and diagnostic circuit 82 also includes a gate driver circuit operative to provide gate drive signals to power semiconductor devices 70.

Input device 18 is coupled to control/communication interface 90 via control/communication input or link 16 for providing control inputs to electrical machine 10, e.g., start/stop (on/off) commands, emergency stop commands, and in some embodiments speed and/or torque control and/or forward/reverse commands. In some embodiments, communication input or link 16B is bidirectional, e.g., so that communication data can flow in both directions between input device 18 and embedded controller 12, which may be used for exchanging communications between input device 18 and controller 12, e.g., diagnostic data, health or condition monitoring, remote configuration changes to controller 12 control parameters, or other communications, e.g., described elsewhere herein. Control/communication input or link 16 may be wired, wireless or optical, and may use any suitable low voltage or current control signal or any suitable communication protocol or system, e.g., mentioned elsewhere herein.

Control/communication interface 90 is coupled to control, protection and diagnostic circuit 82, and provide inputs into control, protection and diagnostic circuit 82 based on the control and communication inputs received from input device 18. In some embodiments, communication interface 90 has an internet protocol (IP) address, and control input or link 16 an Internet link. In some embodiments, control/communication input or link 16 may be an Internet over AC bus/power line communication link and may be part of or coupled to power input 14.

In one form, power supply 80 receives power from grid 62. Power supply 80 is coupled to control, protection and diagnostic circuit 82, and converts the power from grid 62 to a suitable voltage and current for provision to and use by control, protection and diagnostic circuit 82.

Control, protection and diagnostic circuit 82 is operative to control the operation of electrical machine 10, e.g., motor 11, for example, as described above with respect to the embodiment of FIG. 5, by controlling the gate drive signals sent to power semiconductor devices 70. Power semiconductor switching devices 70 are operative to control the flow of power to windings 40 by performing switching, e.g., as previously described, in response to control inputs received via control/communication input 16.

In some embodiments, control, protection and diagnostic circuit 82 in the embodiment of FIG. 6 is operative to measure the phase currents and/or voltage at power semiconductor devices 70, e.g., for use in generating gate drive signals to control the operation of power semiconductor devices 70. In some embodiments, control, protection and diagnostic circuit 82 is also operative to measure current, voltage and/or one or more motor 11 temperatures as part of diagnostic or fault detection or protection. For example, in some embodiments, control, protection and diagnostic circuit 82 is operative to perform diagnostic monitoring based on based on the measured current and/or voltage for each phase and/or based on the measured temperature. In some embodiments, control, protection and diagnostic circuit 82 is operative to perform fault protection for electrical machine 10, e.g., based on the measured current and/or voltage for each phase. In some embodiments, control, protection and diagnostic circuit 82 is operative to provide overload protection for electrical machine 10, e.g., based on the measured current and/or voltage for each phase.

Embodiments of the present invention include an industrial electrical machine, comprising: a stator; a rotor in magnetic communication with the stator; a plurality of windings disposed in the rotor and/or the stator; and an embedded solid state controller operative to control the operation of the industrial electrical machine, the solid state controller including a power semiconductor switching device coupled to the plurality of windings, and including a communication interface, wherein the power semiconductor switching device is operative to provide switching during operation of the industrial electrical machine, and is operative to turn the electrical machine on and to turn the electrical machine off in response to a control input received by the communication interface.

In a refinement, the industrial electrical machine further comprises a frame housing the stator and in thermal communication with the stator; a first cooling system operative to cool the stator and the rotor; and a thermal interface thermally coupling the controller and the frame, wherein the first cooling system is constructed to provide cooling for the solid state controller in addition to cooling the rotor and the stator.

In another refinement, the industrial electrical machine further comprises a second cooling system constructed to provide cooling for the solid state controller.

In yet another refinement, the industrial electrical machine is constructed to be directly connected to a power grid without any intervening contactors for turning the industrial electrical machine on or off.

In still another refinement, the industrial electrical machine is a three-phase machine; and wherein the solid state controller includes a measurement circuit operative to measure current and/or voltage for each phase and/or to measure a temperature of the industrial electrical machine.

In yet still another refinement, the solid state controller includes a circuit is operative to perform diagnostic monitoring based on the measured current and/or voltage for each phase and/or based on the measured temperature.

In a further refinement, the circuit is operative to provide fault protection for the industrial electrical machine.

In a yet further refinement, the circuit is operative to provide overload protection for the industrial electrical machine.

Embodiments of the present invention include an industrial electrical machine, comprising: a stator; a rotor in magnetic communication with the stator; a plurality of windings disposed in the rotor and/or the stator; a frame enclosing the stator and rotor; an embedded power semiconductor switching device disposed in or on the frame and coupled to the plurality of windings, wherein the power semiconductor switching device is operative to turn the electrical machine on and to turn the electrical machine off; an embedded communication interface disposed in or on the frame, wherein the communication interface is operative to receive a control input for controlling the operation of the industrial electrical machine; and an embedded control circuit operative to direct the operation of the power semiconductor switching device based on an output of the communication interface.

In a refinement, the industrial electrical machine is an industrial DOL (Direct On Line) motor.

In another refinement, the DOL motor is an induction motor.

In yet another refinement, the power semiconductor switching device operates as a solid state contactor operative to start and stop the industrial electrical machine.

In still another refinement, the industrial electrical machine further comprises an input device communicatively coupled to the communication interface via a communication link.

In yet still another refinement, the communication link is wireless.

In a further refinement, the communication interface has an IP address, and the communication link is an Internet link.

In a yet further refinement, the communication link is an Internet-over-power-line communication link.

In a still further refinement, the industrial electrical machine is an Internet of Things component.

Embodiments of the present invention include an industrial electrical machine, comprising: a stator; a rotor in magnetic communication with the stator; a plurality of windings disposed in the rotor and/or the stator; a frame enclosing the stator and rotor; and a solid state controller mounted to the frame and constructed as a motor starter, wherein the solid state controller is constructed as a contactor for starting and stopping the industrial electrical machine; is constructed as a circuit breaker for the industrial electrical machine; and constructed as an overload protection relay for the industrial electrical machine.

In a refinement, the solid state controller is constructed as a Direct-On-Line (DOL) motor starter.

In another refinement, the industrial electrical machine is an industrial DOL induction motor.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An industrial electrical machine, comprising:
a stator;
a rotor in magnetic communication with the stator;
a plurality of windings disposed in the rotor and/or the stator;
an embedded solid state controller operative to control the operation of the industrial electrical machine, the solid state controller including a power semiconductor switching device coupled to the plurality of windings, and including a communication interface, wherein the power semiconductor switching device is operative to provide switching during operation of the industrial electrical machine, and is operative to turn the electrical machine on and to turn the electrical machine off in response to a control input received by the communication interface;
a frame housing the stator and in thermal communication with the stator;
a first cooling system operative to cool the stator and the rotor; and
a thermal interface thermally coupling the controller and the frame, wherein the first cooling system is constructed to provide cooling for the solid state controller in addition to cooling the rotor and the stator.

2. The industrial electrical machine of claim 1, further comprising a second cooling system constructed to provide cooling for the solid state controller.

3. The industrial electrical machine of claim 1, wherein the industrial electrical machine is constructed to be directly connected to a power grid without any intervening contactors for turning the industrial electrical machine on or off.

4. The industrial electrical machine of claim 1, wherein the industrial electrical machine is a three-phase machine; and wherein the solid state controller includes a measurement circuit operative to measure current and/or voltage for each phase and/or to measure a temperature of the industrial electrical machine.

5. The industrial electrical machine of claim 4, wherein the solid state controller includes a circuit is operative to perform diagnostic monitoring based on the measured current and/or voltage for each phase and/or based on the measured temperature.

6. The industrial electrical machine of claim 5, wherein the circuit is operative to provide fault protection for the industrial electrical machine.

7. The industrial electrical machine of claim 5, wherein the circuit is operative to provide overload protection for the industrial electrical machine.

8. An industrial electrical machine, comprising:
a stator;
a rotor in magnetic communication with the stator;
a plurality of windings disposed in the rotor and/or the stator;
a frame enclosing the stator and rotor;
an embedded power semiconductor switching device disposed in or on the frame and coupled to the plurality of windings, wherein the power semiconductor switching device is operative to turn the electrical machine on and to turn the electrical machine off;
an embedded communication interface disposed in or on the frame, wherein the communication interface is operative to receive a control input from an input device for controlling the operation of the industrial electrical machine; and
an embedded control circuit operative to direct the operation of the power semiconductor switching device based on an output of the communication interface, the embedded communication interface operative to transmit communications from the control circuit to the input device.

9. The industrial electrical machine of claim 8, wherein the industrial electrical machine is an industrial DOL (Direct On Line) motor, and further including a first cooling system operative to cool the stator and the rotor and a thermal interface thermally coupling the controller and the frame, wherein the first cooling system is constructed to provide cooling for the solid state controller in addition to cooling the rotor and the stator.

10. The industrial electrical machine of claim 9, wherein the DOL motor is an induction motor.

11. The industrial electrical machine of claim 8, wherein the power semiconductor switching device operates as a solid state contactor operative to start and stop the industrial electrical machine.

12. The industrial electrical machine of claim 8, further comprising the input device, the input device being communicatively coupled to transmit to communications to, and receive communications from, the communication interface via a communication link.

13. The industrial electrical machine of claim 12, wherein the communication link is wireless.

14. The industrial electrical machine of claim 12, wherein the communication interface has an IP address, and the communication link is an Internet link.

15. The industrial electrical machine of claim 12, wherein the communication link is an Internet-over-power-line communication link.

16. The industrial electrical machine of claim 12, wherein the industrial electrical machine is an Internet of Things component.

17. An industrial electrical machine, comprising:
a stator;
a rotor in magnetic communication with the stator;
a plurality of windings disposed in the rotor and/or the stator;
a frame enclosing the stator and rotor; and
a solid state controller mounted to the frame and constructed as a motor starter, wherein the solid state controller is constructed as a contactor for starting and stopping the industrial electrical machine; is constructed as a circuit breaker for the industrial electrical machine; and
constructed as an overload protection relay for the industrial electrical machine, the solid state controller including a communication interface operative to (1) receive a control input from an input device for controlling at least a direction of rotation of the rotor and a starting operation of the industrial electrical machine, and (2) transmit communications from the control circuit to the input device.

18. The industrial electrical machine of claim 17, wherein the solid state controller is constructed as a Direct-On-Line (DOL) motor starter, and further including a first cooling system operative to cool the stator and the rotor and a thermal interface thermally coupling the controller and the frame, wherein the first cooling system is constructed to provide cooling for the solid state controller in addition to cooling the rotor and the stator.

19. The industrial electrical machine of claim 17, wherein the industrial electrical machine is an industrial DOL induction motor.

* * * * *